United States Patent [19]

Schmidt et al.

[11] Patent Number: 4,529,630
[45] Date of Patent: Jul. 16, 1985

[54] AQUEOUS SUSPENSION OF BENTONITE AND ITS USE FOR COATING THERMAL INSULATING

[75] Inventors: Sabine Schmidt, Bruchkobel; Peter Kleinschmit, Hanau; Rudolf Schwarz, Alzenau-Wasserlos, all of Fed. Rep. of Germany

[73] Assignee: Degussa AG, Frankfurt, Fed. Rep. of Germany

[21] Appl. No.: 481,231

[22] Filed: Apr. 1, 1983

[30] Foreign Application Priority Data

Apr. 2, 1982 [DE] Fed. Rep. of Germany ....... 3212261
Jul. 14, 1982 [EP] European Pat. Off. ......... 82710038.9

[51] Int. Cl.³ .............................................. B05D 3/02
[52] U.S. Cl. .............................. 427/397.7; 106/286.8; 427/402; 428/454
[58] Field of Search .................. 427/397.7, 402; 156/325; 106/286.8; 428/247, 255, 280, 282, 325, 454

[56] References Cited

U.S. PATENT DOCUMENTS 3,869,334 3/1975 Hughes et al. ................... 252/62
4,204,907 5/1980 Korklan ............................ 264/128
4,394,337 7/1983 Kummermehr .................... 264/122

Primary Examiner—James J. Bell
Attorney, Agent, or Firm—Cushman, Darby & Cushman

[57] ABSTRACT

There is prepared an aqueous suspension which in addition to water, consists of 2 to 50 weight % of a mixture of bentonite and inorganic fibers, with the portion of inorganic fiber being 1 to 30 weight % and the portion of bentonite being 1 to 30 weight % and wherein the total amount of solids does not exceed 50 weight %. With the suspension there is attained an improvement of the mechanical properties of thermal insulating molded objects which are employed for thermal insulation and which for example, contain pyrogenically produced silica as a filler by delivery of this suspension on the thermal insulating plate. The suspension can also be delivered on thermal insulating molded bodies on which there is pressed a fiber net or a fiber felt. After applying the suspension several thermal insulating molded bodies can be joined together where the coating formed consisting of bentonite and inorganic fibers acts as binder. The heat insulating molded article in addition to this layer, can have one or more additional coatings based on organic or inorganic lacquer systems, silicone compositions or low melting glazes.

19 Claims, 1 Drawing Figure

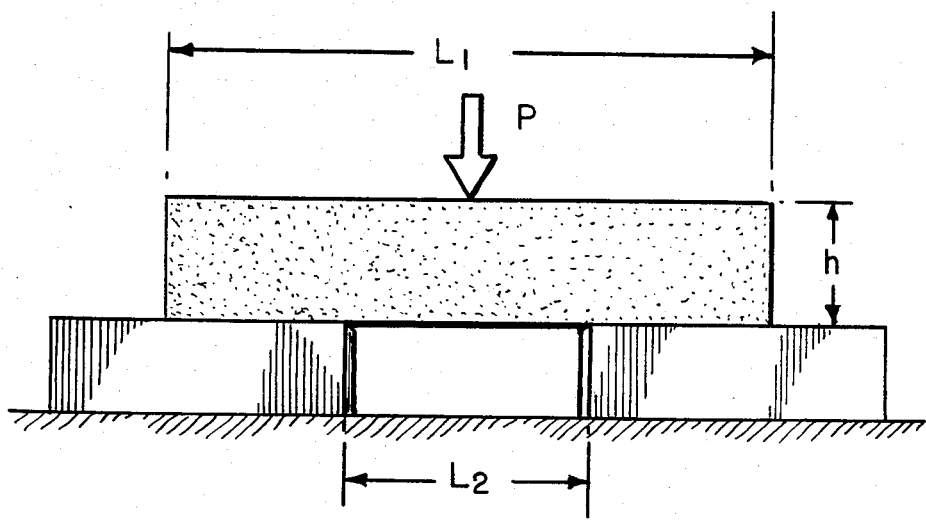

AQUEOUS SUSPENSION OF BENTONITE AND ITS USE FOR COATING THERMAL INSULATING

BACKGROUND OF THE INVENTION

The high temperature insulating materials pressed into thermal insulating molded articles consist of about 40 to 70 weight % of a finely divided component, such as e.g. pyrogenically produced silica, 20 to 50 weight % opacifier, e.g. futile or limenite and 1 to 10 weight % of a high temperature resistant fiber, e.g. aluminum silicate fibers to increase the mechanical stability. The thermal insulating molded articles likewise can have the structure of plates which have jakets, as for example, for the thermal insulation of tubes or waste gas converters in automobiles.

They are available commercially as dry pressed molded articles (such as e.g. thermal insulating plates) of different densities (200 to 320 g/l) for this purpose usually encased in glass fiber webs (borosilicate glass) in various constructions.

The above-mentioned thermal insulating plates have a high abrasion of material and a low mechanical strength which make impossible a direct working up and assembly of the thermal insulating plates without additional reinforcing material. To solve this problem it is known to embed thermal insulating plates in a jacket of plies of fiber. However, this process requires the expenditure of a large amount of energy, is expensive and has the disadvantage that the jacket melts at a temperature treatment of 500° to 700° C., (German AS No. 2036124).

There is known according to German OS No. 2961606 a process in which various binder systems are intermixed directly in the insulating material and subsequently are hardened thermally or catalytically. This process has the disadvantage that the thermal conductivity of the thermal insulating plates is increased considerably. There results from this a considerable deterioration not only of the insulating effect but also of the thermal stability.

Therefore, it was the problem of the invention to find heat insulating molded articles for thermal insulation in which the mechanical properties are improved by increasing the flexural strength and resistance to abrasion. Thereby, there should not occur a deterioration of the insulating and thermal properties of the thermal insulating molded articles.

SUMMARY OF THE INVENTION

The subject matter of the invention is an aqueous suspension consisting essentially of or consisting of, in addition to water, 2 to 50 weight % of a mixture of bentonite and inorganic fibers having 1 to 30 weight % inorganic fibers and 1 to 30 weight % of bentonite based on the total amount of the suspension whereby the total amount of solids does not exceed 50 weight %, preferably 40 weight %, based on the suspension. Preferably the suspension contains besides water, 4 to 10 weight % of inorganic fibers and 5 to 15 weight % of bentonite based on the total amount of suspension, whereby the total amount of solids does not exceed 9 to 25 weight % based on the suspension.

Besides water, the suspension can consist essentially of or consist of 10 to 50 weight % of bentonite and 1 to 10 weight % of inorganic fibers based on the suspension. Also, besides water, the suspension can consist of 10 to 50 weight % bentonite and 1 to 2 weight % of inorganic fibers, based on the suspension.

Bentonite is a known mineral. In a preferred object of the invention bentonite consists largely of montomorillonite (see An Index of Mineral Species & Varieties by H. H. Hey printed by order of the trustees of the British Association 1962).

However, there have also proven suitable suspensions which besides water consist essentially of or consist of 10 to 50 weight % bentonite and between 2 and 4 weight % of inorganic fibers. In many cases, however, there has also proven useful a suspension containing over 10 weight % of inorganic fibers.

The fiber content of the suspension can be varied in relation to the bentonite content. It is advantageous to choose the amount of fibers proportional to the amount of bentonite.

As inorganic fibers there can preferably be used aluminum silicate fibers. The $Al_2O_3$ portion thereby can amount to 5 to 95 weight %, e.g. 20 to 60 weight %.

Further inorganic fibers which can be used alone or in admixture include aluminum oxide, zirconium oxide, calcium silicate, asbestos, quartz and/or silicate glasses.

A further object of the invention is the development of a process for improving the mechanical properties of heat insulating molded articles using a suspension of the invention which is characterized by applying an aqueous suspension, in a given case, repeatedly to the thermal insulating articles, the thermal insulating articles in a given case, being dried at a temperature of 100° to 150° C.

With the help of a spraying device, which can be operated by compressed air, the suspension can be sprayed on the thermal insulating article which generally consists of (or consists essentially of) a highly dispersed filler, e.g. pyrogenic silica, opacifier and fibers. The suspension furthermore can be applied to the thermal insulating articles by means of immersion, rubbing, brushes, or spatulas, among others. In the drying even after a short time there is formed an elastic skin on the thermal insulating article. The small addition of fibers prevents the breaking open of the jacket. In order to attain thicker layers the spraying on process can be repeated several times or there can be used suspensions having higher solid contents. The thermal insulating articles obtained by treating according to the invention have improved mechanical properties, which maintaining the original insulation effect.

In a further illustrative form of the invention there can be additionally pressed on the thermal insulating article a fiber netting or a fiber felt and subsequently there can be applied the coating of the invention. Through this there can be attained an increase in the mechanical strength, especially the flexural strength.

The thermal insulating articles according to an especially practice oriented form of the invention can be joined together one under the other in a building unit principle using the suspension of the invention through which there is possible a seamless union of the thermal insulating articles. For this purpose the suspension of bentonite, water and fibers is applied on at least one side of the thermal insulating articles and these thermal insulating articles can be joined with additional thermal insulating articles in such manner that the suspension on drying forms an intermediate layer of bentonite and inorganic fibers which acts as a binder.

To increase the adhesive properties there can be mixed into the bentonite suspension the desired amounts of silica sol, silicate ester, e.g. methyl silicate, or ethyl silicate. Thereby the amount of additive is regulated so that the bentonite suspension can be further processed, for example, that it can be sprayed.

In a further illustrative form of the invention there can be applied to the thermal insulating article provided with the dried coating at least one overcoat based on an organic or inorganic varnish system or a low melting glaze. The term "varnish" is intended to also include similar compositions such as lacquers and enamels.

It is sufficient if an additional coating is present on the side which after installation of the thermal insulating article, e.g. for heat insulation in a furnace, is the outside, i.e., on the side with the lower temperature stress. The coating is previously dried or in a given case, is also tempered.

Suitable materials for this type of overcoating are organic systems such as acrylic resin varnishes, polyester varnishes, epoxy resin varnishes, alkyd resin varnishes, powder or UV hardening varnishes, including inorganic systems, e.g. based on silicate esters or also sprayed on or silicone coatings applied in other suitable manner. It is also possible to employ low melting glazes, preferably, melting up to 700° C., as coatings.

This type of overcoating of the thermal insulating article only leads to permanent and durable surfaces if the thermal insulating article is previously treated with the bentonite suspension of the invention. A direct application of the abovementioned organic or inorganic coatings to the thermal insulating article which consists of a pressed mixture of about 40 to 70 weight % of a finely divided component such as, e.g. pyrogenically produced silica, 20 to 50 weight % opacifier, e.g. quartz meal, rutile or ilmenite and 1 to 10 weight % of a high temperature resistant fiber, e.g. aluminum silicate, to increase the stability, is not possible without the coating with the bentonite suspension according to the invention.

The relative flexural strength of the thermal insulating article can be controlled by a multiple through the use of these two coatings, depending on the thickness of the overcoat. The second coating also permits the production of adequately stable geometric molded bodies, for example, half shells for insulation of tubes, which previously could not be obtained because of the unsatisfactory mechanical stability of this type of material.

The overcoat adheres excellently to the layer made of the mixture of bentonite and inorganic fibers lying below it. There has not been observed a deterioration of the insulating effect through the additional overcoat.

A further subject matter of the invention is thermal insulating articles which are coated with a mixture of bentonite and inorganic fibers. Thereby the thermal insulating articles can be surrounded by a fiber net or a fiber felt upon which there is applied the layer consisting of a mixture of bentonite and inorganic fibers. The thermal insulating articles can be joined together one beneath the other in a building unit principle with a layer consisting of a mixture of bentonite and inorganic fibers, whereby additionally the non-joined sides can be coated with the mixture consisting of bentonite and fibers.

On all sides or preferably on the outer sides, i.e. on the sides, which after installation of the thermal insulating article for heat insulating purposes, lie on the side with the lower temperature stress, there can be applied additionally on the layer made of the mixture of bentonite and inorganic fibers an overcoat based on organic or inorganic varnish systems or even silicone compounds or low melting glazes. Thereby there can be combined one or more layers of the same or different types of overcoat systems.

The shape of the thermal insulating article is not fixed. In preferred illustrative forms the thermal insulating article has the shape of plates, cylinders or hemispherical jackets (e.g. for pipes or tubular furnaces) or also of box shaped shells, (e.g. for the thermal insulation of auto waste gas converters).

It is basically possible to provide all molded thermal insulating molded articles based on finely divided fillers, opacifiers, and high temperature resistant fibers with the described coating or the additional overcoat.

As finely divided fillers these thermal insulating molded articles can contain pyrogenically produced metal and metalloid oxides such as silica, titanium dioxide, aluminum oxide, zirconium oxide, iron oxide and/or their mixed oxides, precipitated silicas, hydrothermally provided calcium silicate or zeolite.

In a preferred commercial form the thermal insulating articles are made of about 40 to 70 weight % of a finely divided component, such as e.g. pyrogenically produced silica, 20 to 50 weight % of an opacifier such as e.g. quartz meal, rutile, or ilmenite and 1 to 10 weight % of a high temperature resistant fiber such as e.g. aluminum silicate fibers.

The described building unit assembly of these and similar thermal insulating molded articles by means of the suspension of the invention can also be carried out if the thermal insulating articles have already been completely treated with the suspension.

The invention shows the following advantages:

Less material cost, very simple operating procedures.

The insulating effect of the thermal insulating articles is in no way injured, in contrast to known thermal insulating articles in which the binder system is directly intermixed in the insulating material.

The temperature stability of the thermal insulating molded articles is maintained or is even imporved. Ther thermal insulating articles after a heat treatment are not deformed or cracked. There is formed a ceramic coating which can act against shrinkage, (with known thermal insulating molded articles the jacket melts after a corresponding temperature stress and therewith hurts the insulating effect).

Through the use of the bentonite suspension as binder there is possible a seamless processing of the thermal insulating articles.

Unless otherwise indicated all parts and percentages are by weight.

The process can comprise, consist essentially of, or consist of the stated steps with the recited materials and the compositions can consist essentially or or consist of the stated materials.

BRIEF DESCRIPTION OF THE DRAWING

The single FIGURE of the drawing illustrates the method of determining the flexural strength.

DETAILED DESCRIPTION

EXAMPLES

The bentonite used in the examples has the following composition:
$SiO_2 = 57.20\%$
$Al_2O_3 = 18.60\%$
$Na_2O = 2.10\%$ $K_2O = 0.40\%$
$CaO = 1.10\%$
$MgO = 2.50\%$
$Fe_2O_3 = 3.40\%$
$H_2O = 8.30\%$
Particle size <90 micrometer
Loss on Calcining: 10 wt-%

An essential criterium in the evaluation of the quality of thermal insulating articles is above all, their thermal conductivity. However, for the evaluation there is also essential the thermal stability of shape and mechanical strength of the thermal insulating molded articles, as well as their processability or their ability to be installed. The testing of the thermal conductivity, the thermal stability of shape and the mechanical strength in the examples is carried out on round plates having the dimensions 100×20 mm.

COMPARISON EXAMPLE (WITHOUT COATING) A

There was produced in a high speed mixing apparatus having a speed of about 5000 rpm a homogeneous mixture made from 53 weight % of a pyrogenic silica having a BET surface area of 300 m²/g, 40 weight % of a finely divided opacifier (quartz meal) and 7 weight % of a ceramic fiber based on aluminum silicate (60 weight % $Al_2O_3$ portion). The mixture was pressed into plates having a weight per liter of 300 g/l and used as comparison for examples 1 to 5.

EXAMPLE 1

There was produced in a high speed mixing apparatus (about 1000 to 2000 rpm and 2 to 3 minutes mixing time), a homogeneous suspension made of 85 weight % water, 13 weight % bentonite and 2 weight % of aluminum silicate fibers (60 weight % $Al_2O_3$). The aluminum silicate fibers before the mixing were ground to a fiber length of 0.5 to 2 mm. The suspension was applied to the surface of the thermal insulating plates according to Comparison Example A with the help of a spraying process. There was used a flat, wide omni-directional pistol whereby the bentonite suspension was torn apart by the injector of the atomizing air in the spray jet and thus was distributed uniformly on the insulating plate. The sprayed plates were dried at 100° C. These thermal insulating plates are then subjected to the following test methods:

1. Thermal conductivity in W/m°C. (Watts per meter °Celsius).
2. Shrinkage of the thermal insulating plate diameter in % at 1000° C. and a time of holding of 10 hours.
3. Relative flexural strength in Newtons, whereby the thermal insulating plates are placed as beams on two supports and are subjected to stress through the concentrated load P in the middle. Thereby as shown in FIG. 1:

P = concentrated load in Newtons (see the Table)
$L_1$ = Sample length of 100 mm
h = Sample height of 20 mm
$L_2$ = Width of support of 40 mm.

Through uniform increase of the load the sample is smoothly subjected to bending. In the examples carried out there was selected an increase of the concentrated load of 5 mm/min. The relative values for the loading capacity for the corresponding samples was given in Newtons.

EXAMPLE 2

There was produced thermal insulating molded articles in the form of plates according to comparison example A, whereby in the manufacture of the plates there were pressed on the surface of the thermal plates a fiber felt or fiber fleece.

Subsequently, the thermal insulating plates were post-treated in accordance with the process described in Example 1 with a bentonite suspension. The relative flexural strength thereby can be increased additionally about 50 to 200% according to the thickness of the felt or fleece and the length of their individual fibers.

EXAMPLE 3

There was produced a suspension made of 83 weight % water, 13 weight % bentonite and 4 weight % aluminum silicate fibers according to Example 1. This was applied to the surface of the thermal insulating molded article in the form of plates described in Comparison Example A with the help of a spraying process. The thermal insulating article was subsequently dried at 100° C.

EXAMPLE 4

Thermal insulating articles were surface treated according to the process described in Example 3 and additionally coated on one side with an acrylic powder varnish.

EXAMPLE 5

Thermal insulating articles were surface treated according to the process described in Example 3 and additionally there was melted on one side of the surface a glaze (e.g. $PbSiO_3$).

COMPARISION EXAMPLE B (WITHOUT COATING)

There was produced in a high speed mixing apparatus having a speed of about 5000 rpm a homogeneous mixture made of 63 weight % of a pyrogenic silica having a BET surface area of 300 m²/g, 30% of a finely divided opacifier (rutile) and 7 weight % of a ceramic fiber based on aluminum silicate (60 weight % $Al_2O_3$). The mixture can be pressed to thermal insulating articles. In the present case there was chosen the form of plates just as in Comparison Example A.

EXAMPLE 6

There was produced a suspension made of 81 weight % water, 15 weight % bentonite and 4 weight % aluminum silicate fibers (60 weight % $Al_2O_3$) according to Example 1. This was applied to the surface of the plates described in Comparison Example B with the help of a spraying process. The thermal insulating articles were subsequently dried at 100° C. There was obtained a smooth and at the same time, abrasion resistant surface.

EXAMPLE 7

Plates were surface treated according to the process decribed in Example 6. The coating consisting of bentonite and inorganic fibers then serves as base material for an acrylic powder varnish. The varnish was applied to one side of the plate whereby the varnished side in assembly the plates represented the outer side (cold side). The single sided varnishing sufficed to increase the breaking strength of the plates around 2 to 3 times.

The surface was smooth and free from abrasion and additionally free from scratches.

COMPARISON EXAMPLE C

Hydrothermally produced calcium silicate molded parts in the form of plates having a liter weight of about 240 g/l were used as a comparison for Examples 8 and 9.

EXAMPLE 8

There were produced a suspension from 81 weight % water, 15 weight % bentonite and 4 weight % aluminum silicate (60 weight % $Al_2O_3$) according to Example 1. This was applied to the surface of the plate described in Comparison Example 3 with the help of a spraying process. There were obtained a smooth and at the same time abrasion free surface.

EXAMPLE 9

There were surface treated plates according to the process described in Example 8. The coating, consisting of bentonite and inorganic fibers, then served as base material for an acrylic powder varnish. The varnish was applied to one side of the plates whereby the varnished side in assembling the plates represented the outer side (cold side). The one-sided varnishing was sufficient to increase the breaking strength around 2 times. The surface was smooth, abrasion resistant and in addition, scratch free.

The values determined are set forth in Tables 1, 2, and 3.

TABLE 1

| Sample | Relative Flexural Strength in N (at Break of the Sample) | Deviation of the Relative Flexural Strength | Mean Temperature °C. | Thermal Conductivity W/m °C. | Shrinkage in Diameter of the Plate at 1000° C. and 10 h | Surface Quality |
|---|---|---|---|---|---|---|
| Comparison Example A | 62.9 79.8 75.6 64.9 69.7 | 70.6 ± 7.1 | 163 299 357 465 | 0.029 0.029 0.033 0.041 | 2.3 | rough abradable surface |
| Example 1 | 127.6 119.3 138.8 116.1 123.2 | 125.0 ± 8.8 | 162 252 360 466 | 0.029 0.030 0.036 0.042 | 1.2 | smooth abrasion resistant surface |
| Example 3 | 146.6 139.2 140.0 | | The additional coating does not affect the insulating effect | | | smooth abrasion resistant surface |
| Example 4 | 185.0 185.2 178.3 | | The additional coating does not affect the insulating effect | | | smooth abrasion resistant and also scratch resistant surface |
| Example 5 | 185.4 183.0 184.6 | | | | | smooth abrasion resistant and also scratch resistant surface |

TABLE 2

| Sample | Relative Flexural Strength in N (at Break of the Sample) | Deviation of the Relative Flexural Strength | Mean Temperature °C. | Thermal Conductivity W/m °C. | Shrinkage in Diameter of the Plate at 1000° C. and 10 h | Surface Quality |
|---|---|---|---|---|---|---|
| Comparison Example C | 254.3 246.2 239.8 | | 167 276 388 497 | 0.0704 0.0809 0.0947 0.1082 | 1-2 | easily abradable surface |
| Example 8 | 362.2 354.5 333.2 | | 166 278 385 498 | 0.0717 0.0795 0.0936 0.1076 | 1-2 | smooth abrasion resistant surface |
| Example 9 | 564.5 521.3 526.5 | | The additional coating does not affect the insulating effect | | 1-2 | smooth abrasion resistant and scratch resistant surface |

TABLE 3

| Sample | Relative flexural strength in N (at break of the sample) | Deviation of the relative flexural strength | Mean Temperature °C. | Thermal Conductivity W/m °C. | Shrinkage in diameter of the plate at 1000° C. and 10 h | Surface quality |
| --- | --- | --- | --- | --- | --- | --- |
| Comparison Example C | 254.3 246.2 239.8 | | 167 276 388 497 | 0.0704 0.0809 0.0947 0.1082 | 1–2 | easily abradable surface |
| Example 8 | 362.2 354.5 333.2 | | 166 278 385 498 | 0.0717 0.0795 0.0936 0.1076 | 1–2 | smooth abrasion resistant surface |
| Example 9 | 564.5 521.3 526.5 | | The additional coating does not affect the insulating effect | | 1–2 | smooth abrasion resistant and scratch resistant surface |

What is claimed is:

1. A process for improving the mechanical properties of a thermal insulating molded article comprising applying an aqueous suspension consisting essentially of water and 2 to 50 weight % of a mixture of bentonite and inorganic fibers, the bentonite being 1 to 30 weight % and the inorganic fibers 1 and 30 weight % based on the total weight of the suspension, the total solids content of the suspension not exceeding 50 weight % based on the total weight % of the suspension to the article, and drying the applied suspension.

2. A process according to claim 1 wherein the total solids are not over 40% of the total weight of the suspension.

3. A process according to claim 1 consisting essentially of water, 4 to 10 weight % inorganic fibers and 5 to 15 weight % bentonite based on the total weight of the suspension, the total solids content not exceeding 9 to 25 weight % based on the suspension.

4. A process according to claim 1 consisting of water, 10 to 50 weight % bentonite and 1 to 10 weight % inorganic fibers based on the suspension.

5. A process according to claim 1 consisting of water 10 to 50 weight % bentonite and 1 to 2 weight % inorganic fibers based on the suspension.

6. A process according to claim 1 consisting of water, 10 to 50 weight % bentonite and 2 to 4 weight % inorganic fibers based on the suspension.

7. An aqueous suspension according to claim 1 wherein the fibers are aluminum silicate fibers.

8. An aqueous suspension according to claim 7 wherein the $Al_2O_3$ portion of the fibers is 5 to 95 weight %.

9. An aqueous suspension according to claim 8 wherein the $Al_2O_3$ portion of the fibers is 20 to 60 weight %.

10. A process according to claim 1 wherein the thermal insulating article contains pyrogenically produced silica.

11. A process according to claim 1 wherein the inorganic fibers are aluminum silicate, aluminum oxide, zirconium oxide, calcium silicate, asbestos, quartz, or silicate glass fibers, or a mixture of such fibers.

12. A process according to claim 1 wherein the aqueous suspension is applied repeatedly to the thermal insulating article.

13. A process according to claim 1 including the step of drying the article at 100° to 150° C. after applying the aqueous suspension.

14. A process according to claim 1 comprising pressing a fiber net or fiber felt on the thermal insulating article and then applying the aqueous suspension to form a coating.

15. A process according to claim 1 comprising applying the suspension to at least one side of the thermal insulating article and then joining the applied side to additional thermal insulating articles and drying in such manner that the suspension forms an intermediate binding layer of bentonite and inorganic fibers.

16. A process according to claim 14 comprising applying the suspension to at least one side of the thermal insulating article and then joining the applied side to additional thermal insulating articles and drying in such manner that the suspension forms an intermediate binding layer of bentonite and inorganic fibers.

17. A process according to claim 16 comprising applying at least one overcoat based on an organic or inorganic varnish system or a low melting glaze to the thermal insulating article having the dried bentonite and inorganic fiber coating thereon.

18. A process according to claim 15 comprising applying at least one overcoat based on an organic or inorganic varnish system or a low melting glaze to the thermal insulating article having the dried bentonite and inorganic fiber coating thereon.

19. A process according to claim 1 comprising applying at least one overcoat based on an organic or inorganic varnish system or a low melting glaze to the thermal insulating article having the dried bentonite and inorganic fiber coating thereon.

* * * * *